United States Patent
Li et al.

(10) Patent No.: US 10,794,180 B2
(45) Date of Patent: Oct. 6, 2020

(54) MINESHAFT-STRATUM FRACTURE COUPLED FLOWING SIMULATION EXPERIMENT DEVICE AND METHOD

(71) Applicant: SOUTHWEST PETROLEUM UNIVERSITY, Chengdu (CN)

(72) Inventors: Gao Li, Chengdu (CN); Yi Feng, Chengdu (CN); Shunhui Yang, Chengdu (CN); Yijian Chen, Chengdu (CN); Na Wei, Chengdu (CN); Yingfeng Meng, Chengdu (CN); Rui Li, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 207 days.

(21) Appl. No.: 16/305,895

(22) PCT Filed: Sep. 27, 2017

(86) PCT No.: PCT/CN2017/103766
§ 371 (c)(1),
(2) Date: Nov. 30, 2018

(87) PCT Pub. No.: WO2018/103426
PCT Pub. Date: Jun. 14, 2018

(65) Prior Publication Data
US 2020/0217193 A1    Jul. 9, 2020

(30) Foreign Application Priority Data

Dec. 6, 2016 (CN) .......................... 2016 1 1109716

(51) Int. Cl.
*E21B 49/00* (2006.01)
*E21B 21/08* (2006.01)
(Continued)

(52) U.S. Cl.
CPC .............. *E21B 49/00* (2013.01); *E21B 21/08* (2013.01); *E21B 21/10* (2013.01); *E21B 34/08* (2013.01);
(Continued)

(58) Field of Classification Search
CPC .......... E21B 49/00; E21B 21/08; E21B 21/10; E21B 34/08; E21B 43/12; E21B 43/26;
(Continued)

(56) References Cited

U.S. PATENT DOCUMENTS

2003/0139916 A1* 7/2003 Choe ................... E21B 41/0007
703/10
2011/0186304 A1 8/2011 Tinker et al.
2016/0357888 A1* 12/2016 Li ........................... E21B 43/34

FOREIGN PATENT DOCUMENTS

CN      102305045 A     1/2012
CN      204098907 U     1/2015
(Continued)

OTHER PUBLICATIONS

Gang Shu, Study on Spillage and Leakage Coexistent Flowing Law and Models of Drilling in Fractured Stratum, Southwest Petroleum University, 2012.
(Continued)

*Primary Examiner* — Benjamin R Schmitt
(74) *Attorney, Agent, or Firm* — Bayramoglu Law Offices LLC

(57) ABSTRACT

A mineshaft-stratum fracture coupled flowing simulation experiment device includes a simulated mineshaft flowing system, a simulated stratum system, a simulated fracture system and a data acquisition system. The simulated mineshaft flowing system includes simulated mineshaft, simulated drilling rod, drilling fluid storage tank, stirring motor, and drilling fluid screw pump. The simulated drilling rod is
(Continued)

located in center of the simulated mineshaft. The stirring motor is provided in the drilling fluid storage tank. The drilling fluid screw pump is connected to an inlet end of the simulated drilling rod through the drilling fluid storage tank. The simulated stratum system includes simulated stratum, clean water storage tank, separation tank, gas storage tank, gas air-compressor, and clean water screw pump. The gas storage tank is connected to the gas air-compressor and is connected to the simulated stratum through a gas pressure regulating valve.

5 Claims, 1 Drawing Sheet

(51) Int. Cl.
| | | |
|---|---|---|
| *E21B 21/10* | (2006.01) | |
| *E21B 34/08* | (2006.01) | |
| *E21B 43/12* | (2006.01) | |
| *E21B 43/26* | (2006.01) | |
| *E21B 47/06* | (2012.01) | |
| *G01M 99/00* | (2011.01) | |

(52) U.S. Cl.
CPC ............ *E21B 43/12* (2013.01); *E21B 43/26* (2013.01); *E21B 47/06* (2013.01); *G01M 99/00* (2013.01)

(58) Field of Classification Search
CPC .......... E21B 47/06; E21B 21/06; E21B 34/06; G01M 99/00
USPC .......................................... 73/152.01, 865.6
See application file for complete search history.

(56) References Cited

FOREIGN PATENT DOCUMENTS

| | | |
|---|---|---|
| CN | 105317432 A | 2/2016 |
| CN | 205654336 U | 10/2016 |
| CN | 106640061 A | 5/2017 |
| CN | 206256908 U | 6/2017 |

OTHER PUBLICATIONS

Tingxue Jiang et al., Calculation model of Steady-state Capacity of Vertical Fractured Well Considering Flowing in Mineshaft, Petroleum Drilling and Production Technology, 2001, pp. 50-53.
Yu Liu, Study of Pressure Behavior and Productivity for Vertical Fractured Well in Complex Conditions, Daqing Petroleum Institute Northeast Petroleum University, 2006.
Zhijun Li, Research on Gas-liquid Displacement of Vertical Fractured Stratum and Anti-gas Intrusion and Plugging Technology of Drilling Fluid, Southwest Petroleum University, 2014.

* cited by examiner

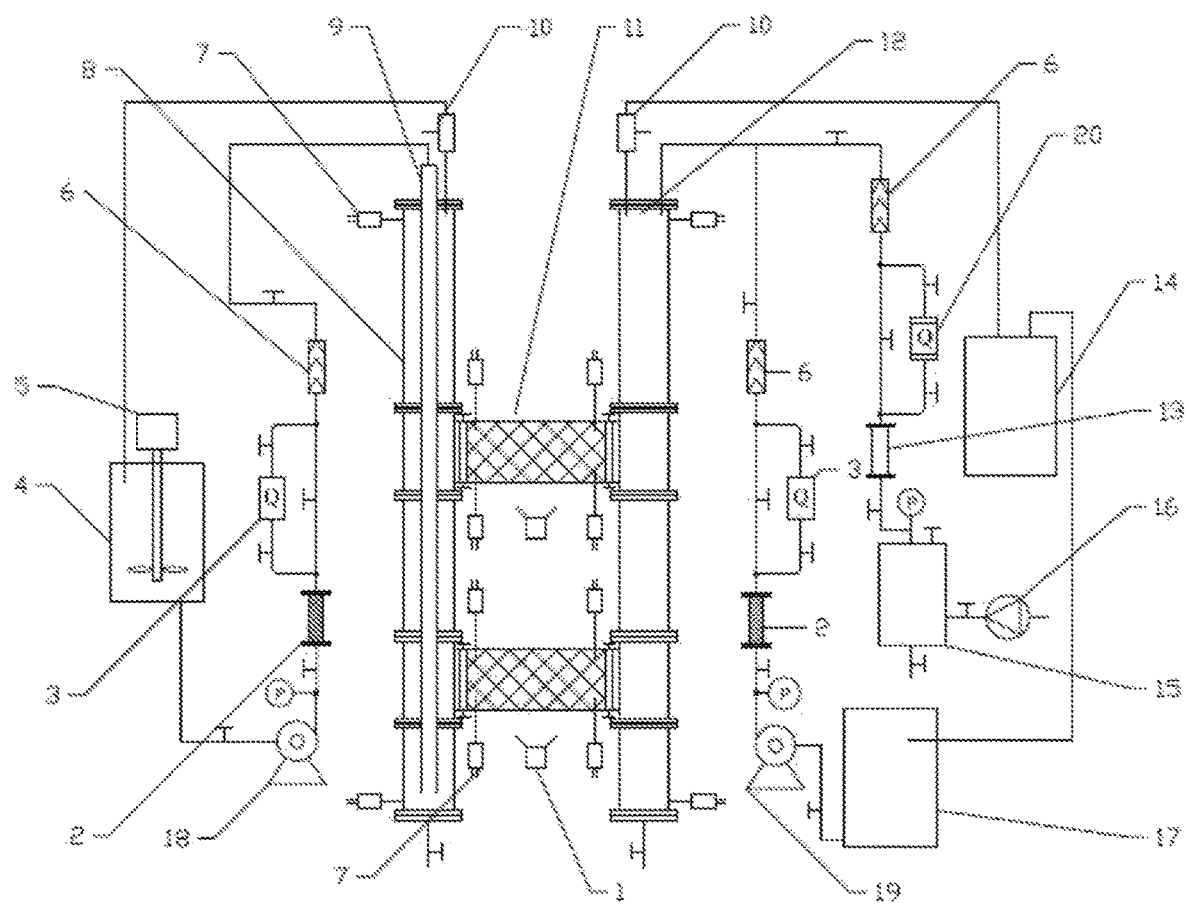

MINESHAFT-STRATUM FRACTURE COUPLED FLOWING SIMULATION EXPERIMENT DEVICE AND METHOD

CROSS REFERENCE TO THE RELATED APPLICATIONS

This application is the national phase entry of International Application No. PCT/CN2017/103766, filed on Sep. 27, 2017, which claims priority to Chinese Patent Application 201611109716.0 filed on Dec. 6, 2016, the entire contents of which are incorporated herein by reference.

TECHNICAL FIELD

The present invention relates to the field of studies on indoor oil and gas drilling and production experiment devices, in particular to a mineshaft-stratum fracture coupled flowing simulation experiment device and method.

BACKGROUND

In oil and gas drilling and production, fractures while drilling are of a common engineering phenomenon. Once the fractures are in fluid communication with a stratum, the fractures around a mineshaft will serve as main channels for oil and gas seepage in an oil reservoir. The fractures often cause engineering problems such as difficulty in mineshaft pressure control and difficulty in design of fracture proppants. Therefore, the study on flowing of fluid in a mineshaft, stratum and fractures around a well is of a great significance on oil and gas production capacity prediction, mineshaft pressure control, fractured rock stratum leakage stoppage and reasonable fracturing fluid proppant design.

The flowing in fractures and mineshaft is a continuous coupling integer, and the flowing states of them are mutually constrained. However, at present, there are fewer experimental methods for combining the flowing of fluid in the mineshaft and the fracture in China. Most of experimental equipments are separately studied for the flowing in the mineshaft or the fractures. Moreover, the components, pressure and other situations of fluid in the actual mineshaft stratum are not considered.

In general, the current experimental equipment generally lacks experiment devices and methods that consider the relatively comprehensive coupled flowing of fluid in a mineshaft and a stratum. The patent "A Mineshaft Fracture Simulation Device" (CN102305045A) simulates a drilling leakage process by inserting a fracture pipe into a simulated mineshaft, without considering the specific conditions of the stratum. The patent "Studying Device for Studying Spillage and Leakage Coexistent Occurrence Mechanism of Fractured stratum" (CN204098907U) is used to evaluate the spillage and leakage coexistent occurrence mechanism of a fractured stratum by connecting a mineshaft and a simulated stratum with a fracture plate. Although this device considers both the situations of the mineshaft and the stratum, the replacement of the stratum fluid and the drilling fluid is not involved.

At present, there are fewer studies on displacement devices and methods for flowing in mineshaft fractures in literatures in China. The complex flowing problems in the actual mineshaft and the simulated stratum pressure control are not involved in many literatures (Shu Gang, Study on Spillage and Leakage Coexistent Flowing Law and Models of Drilling in Fractured Stratum [D], Southwest Petroleum University, 2012; Jiang Tingxue, Jiang Dong, Calculation model of Steady-state Capacity of Vertical Fractured Well Considering Flowing in Mineshaft [J], Petroleum Drilling and Production Technology, 2001, 23(4): 50-53; Liu Yu. Study on Pressure Dynamics and Capacity of Vertical Fractured Well Under Complex Conditions [D], Daqing Petroleum Institute Northeast Petroleum University, 2006). There are also studies on gas-liquid displacement devices (Li Zhijun, Research on Gas-liquid Displacement of Vertical Fractured Stratum and Anti-gas Intrusion and Plugging Technology of Drilling Fluid [D], Southwest Petroleum University, 2014), however, the stratum conditions are not simulated and the influence of circulation on annular flowing in the mineshaft is not considered. Therefore, there are fewer studies on the interaction of flowing of fluid in fractures, mineshaft and stratum. At the same time, the indoor experimental equipment generally lacks experiment devices and methods that consider the relative comprehensive coupled flowing of mineshaft and stratum fluid. Therefore, it is of great significance for the study of drilling and completion fractures to establish an experiment device adapted to the flowing in actual fractures mineshaft fractured while drilling.

Technical Problem

An objective of the present invention aims to provide a mineshaft-stratum fracture coupled flowing simulation experiment device. This device is configured to simulate the flowing displacement of stratum fluid and mineshaft circulating drilling fluid in stratum fractures while drilling, control a flow rate of mineshaft drilling fluid, mineshaft pressure, gas-liquid ratio of fluid in a simulated stratum, stratum pressure, etc., simultaneously simulate flowing in two sets of fractures and more fully reflect the effect of fractures on the flowing in the mineshaft.

An objective of the present invention is to provide a method for performing a simulation experiment on coupled flowing in a mineshaft and stratum fractures by using the device. This method is reliable and easy to operate. This method combines the actual practice of drilling and completion engineering, comprehensively considers the factors, such as flowing in fractures, flowing in mineshaft and stratum conditions, and provides more accurate and credible data support and theoretical basis for further study of coupled flowing in the mineshaft and stratum fractures to overcome defects and deficiencies of the prior art.

SUMMARY

To fulfill said technical objectives, the present invention adopts the following technical solutions.

A mineshaft-stratum fracture coupled flowing simulation experiment device is composed of a simulated mineshaft flowing system, a simulated stratum system, a simulated fracture system and a data acquisition system.

The simulated mineshaft flowing system comprises a simulated mineshaft, a simulated drilling rod, a drilling fluid storage tank, a screw pump and a plurality of valves for controlling the flowing in a mineshaft; the screw pump is connected to the drilling fluid storage tank and an inlet end of the simulated drilling rod; the simulated drilling rod is located in the center of the mineshaft; a stirring motor is included in the drilling fluid storage tank; the plurality of valves for controlling the flowing in the mineshaft include a liquid pressure regulating valve and a one-way valve located between the screw pump and the inlet of the simulated drilling rod, and a constant-pressure overflowing valve located between the simulated mineshaft and the separation tank.

The simulated stratum system comprises a simulated stratum, a clean water storage tank, a gas storage tank, a separation tank, a screw pump, a gas air-compressor, and a plurality of valves for controlling the flowing in a stratum; a confluence channel of water in the clean water storage tank and gas in the gas storage tank is taken as a gas-liquid junction; the screw pump is located between the clean water storage tank and the gas-liquid junction; the gas air-conditioner is located outside the gas storage tank; the simulated stratum is connected to the separation tank; the separation tank is connected to the clean water storage tank; the plurality of valves for controlling the flowing in the stratum include a constant-pressure overflowing valve located between the simulated stratum and the separation tank, a one-way valve located between the screw pump and the simulated stratum, and a one-way valve located between the gas storage tank and the simulated stratum; a safety valve, a pressure gauge and a ventilation switch are provided in the gas storage tank.

The simulated fracture system comprises two sets of upper and lower simulated fractures, each set of simulated fractures being a space formed by two parallel transparent resin plates; two sides of each of the simulated fractures are connected to the simulated mineshaft and the simulated stratum respectively; a high-definition camera is provided in front of each of the simulated fractures.

The data acquisition system comprises a gas flow meter, two liquid flow meters, a plurality of pressure sensors, two high-definition cameras, and a computer; the gas flow meter is provided between the gas storage tank and the simulated stratum; the liquid flow meter is provided between the drilling fluid storage tank and the simulated drilling rod, as well as between the clean water storage tank and the simulated stratum respectively; the pressure sensor is located at the wellhead and bottom of the simulated mineshaft, the upper and lower ends of the simulated stratum, and the upper, lower, left and right parts of each of the simulated fractures respectively; the high-definition camera is provided in front of the simulated fractures respectively; each pressure sensor is connected to an interface of the computer; bundled software is installed in the computer.

The simulated mineshaft is made of a transparent glass pipe material, and the simulated drilling rod is made of a PVC pipe. The drilling fluid annularly flows out from the simulated drilling rod through the simulated mineshaft to simulate a flowing state of the drilling fluid during the drilling process. The simulated stratum contains two fluids of gas and liquid. The internal pressure of the simulated stratum is controlled by the constant-pressure overflowing valve to simulate an oil-gas state of the stratum and a fluid pressure of the stratum. A fluid drainage valve is connected to the separation tank and used for returning fluid. The screw pump in the simulated mineshaft flowing system is equipped with a liquid supply valve, an outlet end pressure gauge and a fluid conveying valve and used for pumping the fluid in the drilling fluid storage tank into the simulated drilling rod. The screw pump in the simulated stratum system is also equipped with a liquid supply valve, an outlet end pressure gauge and a fluid conveying valve and used for pumping the fluid in the clean water storage tank into the simulated stratum.

In the simulated mineshaft flowing system, the constant-pressure overflowing valve is used to control the pressure in the simulated drilling rod to be constant. When the internal pressure of the simulated drilling rod exceeds a limit value, the fluid flows into the drilling fluid storage tank through the constant-pressure overflowing valve, thereby controlling the internal pressure of the simulated drilling rod to be constant. In the simulated stratum system, the constant-pressure overflowing valve is used to control the pressure in the simulated stratum to be constant. When the internal pressure of the simulated stratum exceeds a limit value, the fluid flows into the separation tank through the constant-pressure overflowing valve, thereby controlling the internal pressure of the simulated stratum to be constant.

In the simulated mineshaft flowing system, the one-way valve is used to control a flow direction of the fluid, so that the fluid in the simulated drilling rod does not flow back into the drilling fluid storage tank, and control the flowing direction of a fluid path to conform to the flowing state of the fluid in the actual drilling process. The one-way valve between the clean water storage tank and the simulated stratum in the simulated stratum system and the one-way valve between the gas storage tank and the simulated stratum are used to control the fluid in the fluid path or the gas path not to return, such that gas and fluid are efficiently mixed and then the gas and fluid mixture can enter the simulated stratum, and returns from the overflowing valve without refluxing when the pressure of the fluid in the simulated stratum is too high.

Beneficial Effects

Compared with the prior art, the present invention has the following beneficial effects:

(1) the present invention can simulate the flowing situations of fluid in the mineshaft and fractures under different drilling fluids, different mineshaft pressures, different stratum fluids and different stratum pressure environments, and provides an experiment method for the study on the flowing in fractures and its influence law in petroleum exploitation in combination with engineering practices;

(2) the present invention is complete in function, complete in consideration and simple to operate, and is of great significance to the engineering related to flowing in drilling fractures.

BRIEF DESCRIPTION OF THE DRAWINGS

FIG. 1 is a schematic structural diagram of a mineshaft-stratum fracture coupled flowing simulation experiment device.

In drawings, reference symbols represent the following components: 1—high-definition camera; 2—liquid pressure regulating valve; 3—liquid flow meter; 4—drilling fluid storage tank; 5—stirring motor; 6—one-way valve; 7—pressure sensor; 8—simulated mineshaft; 9—simulated drilling rod; 10—constant-pressure overflowing valve; 11—simulated fracture; 12—simulated stratum; 13—gas pressure regulating valve; 14—separation tank; 15—gas storage tank; 16—gas air-compressor; 17—clean water storage tank; 18—drilling fluid screw pump; 19—clean water screw pump; 20—gas flow meter.

DETAILED DESCRIPTION OF THE EMBODIMENTS

The present invention will now be further described with reference to the drawings and embodiments.

As shown in FIG. 1, a mineshaft-stratum fracture coupled flowing simulation experiment device is composed of a simulated mineshaft flowing system, a simulated stratum system, a simulated fracture system and a data acquisition system.

The simulated mineshaft flowing system comprises a simulated mineshaft 8, a simulated drilling rod 9, a drilling fluid storage tank 4, a stirring motor 5, and a drilling fluid screw pump 18; the simulated drilling rod 9 is located in the center of the simulated mineshaft 8; the stirring motor 5 is provided in the drilling fluid storage tank 4; the drilling fluid screw pump 18 is connected to an inlet end of the simulated drilling rod 9 through the drilling fluid storage tank 4.

The simulated stratum system comprises a simulated stratum 12, a clean water storage tank 17, a separation tank 14, a gas storage tank 15, a gas air-compressor 16, and a clean water screw pump 19; the gas storage tank 15 is connected to the gas air-compressor 16 and is connected to the simulated stratum 12 through a gas pressure regulating valve 13; the clean water screw pump 19 is connected to the simulated stratum 12 through the clean water storage tank 17; the simulated stratum 12 is connected to the separation tank 14.

The simulated fracture system comprises two sets of upper and lower simulated fractures 11, each set of simulated fractures being a space formed by two parallel transparent resin plates; two sides of each of the simulated fractures are connected to the simulated mineshaft 8 and the simulated stratum 12 respectively; a high-definition camera 1 is provided in front of each of the simulated fractures.

The data acquisition system comprises a gas flow meter 20, a liquid flow meter 3, a pressure sensor 7, a high-definition camera 1, and a computer. A gas flow meter 20 is provided between the gas storage tank and the simulated stratum; a liquid flow meter 3 is provided between the drilling fluid storage tank 4 and the simulated drilling rod 9, as well as between the clean water storage tank 17 and the simulated stratum 12 respectively; the wellhead and bottom of the simulated mineshaft 8, the upper and lower ends of the simulated stratum 12 and the simulated fractures 11 are connected to a pressure sensor 7 respectively; the high-definition camera 1 is provided in front of the simulated fractures respectively; the gas flow meter, the liquid flow meter, the pressure sensor, and the high definition camera are all connected to the computer.

A liquid pressure regulating valve 2 and a one-way valve 6 are provided between the drilling fluid screw pump 18 and an inlet end of the simulated drilling rod 9, as well as between the clean water screw pump 19 and the simulated stratum 12 and configured to control the one-way flowing of fluid.

A constant-pressure overflowing valve 10 is provided between the simulated mineshaft 8 and the drilling fluid storage tank 4, as well as between the simulated stratum 12 and the separation tank 14 and configured to control the pressure inside the simulated mineshaft and the simulated stratum to be constant.

A method for performing a simulation experiment on coupled flowing in a mineshaft and stratum fractures by using the above-mentioned device sequentially comprising the following steps:

(1) pumping drilling fluid in the drilling fluid storage tank 4 into the simulated drilling rod 9 by means of the drilling fluid screw pump 18 through the liquid pressure regulating valve 2 and the one-way valve 6, annularly returning the drilling fluid through the simulated mineshaft 8 to the drilling fluid storage tank 4 through the constant-pressure overflowing valve 10, regulating the pressure of the fluid in the simulated mineshaft through the liquid pressure regulating valve 2 and the constant-pressure overflowing valve 10, and simulating an actual mineshaft environment;

(2) conveying water in the clean water storage tank 17 to flow to the simulated stratum 12 by means of the clean water screw pump 19 through the liquid pressure regulating valve 2 and the one-way valve 6, pressing gas in the gas storage tank 15 by means of the gas air-compressor 16 through the gas pressure regulating valve 13 and the one-way valve 6, carrying out gas-liquid mixing and then conveying the mixture into the simulated stratum 12

(3) conveying fluid overflowing from the simulated stratum 12 to the separation tank 14 through the constant-pressure overflowing valve 10 for separation, and then returning to the clean water storage tank 17; regulating the gas-liquid content of the simulated stratum and the pressure of the simulated stratum through the liquid pressure regulating valve, the gas pressure regulating valve and the constant-pressure overflowing valve, and simulating a stratum environment; and (4) switching on a simulated fracture switch 11 and simulating mineshaft-fracture coupled flowing.

Embodiment 1

The specific steps of carrying out the simulation experiment on the coupled flowing in the mineshaft and stratum fractures are as follows:

a, preliminary preparation of the experiment:

installing the simulated fractures and closing switches on both sides; checking if the fluid in the storage tank is sufficient; setting all valves to an off state; turning on the data acquisition system, and checking if the data are displayed normally; checking if all instruments and apparatuses are working normally;

b, turning on the experiment device:

opening a valve at the simulated mineshaft flowing system to form a passage, and turning on the screw pump at this moment, such that the liquid path at the simulated mineshaft flowing system forms a passage; opening a valve at the simulated stratum system, and turning on the screw pump and the gas air-compressor;

c, performing a fracture flowing simulation experiment:

first, setting the pressures of the liquid pressure regulating valve and the constant-pressure overflowing valve of the simulated mineshaft flowing system to a certain value respectively, so that the condition of the simulated mineshaft reaches an experimental design condition; regulating the pressures of the liquid pressure regulating valve, the gas pressure regulating valve and the constant-pressure overflowing valve at the simulated stratum system to a certain value respectively, so that the condition of the simulated stratum reaches an experimental design condition; turning off the gas flow meter and the liquid flow meter, closing a main liquid path valve, and recording the inflow flow of the fluid; turning on the high-definition camera to record the flowing situations of the fracture surface; opening switches on both sides of the simulated fractures, such that coupled flowing of fluid in the mineshaft and stratum in the fracture space is simulated; at the end of the experiment, turning off the screw pump and the gas air-compressor; closing each valve; and draining waste fluid; and d, the results of the experiment:

collecting data from the high-definition cameras; organizing data acquired from the data acquisition system; and analyzing the data.

What is claimed is:

1. A mineshaft-stratum fracture coupled flowing simulation experiment device, comprising: a simulated mineshaft flowing system, a simulated stratum system, a simulated fracture system and a data acquisition system;
   wherein the simulated mineshaft flowing system comprises a simulated mineshaft, a simulated drilling rod, a drilling fluid storage tank, a stirring motor, and a drilling fluid screw pump;
   the simulated drilling rod is located in the center of the simulated mineshaft;
   the stirring motor is provided in the drilling fluid storage tank;
   the drilling fluid screw pump is connected to an inlet end of the simulated drilling rod through the drilling fluid storage tank;
   the simulated stratum system comprises a simulated stratum, a clean water storage tank, a separation tank, a gas storage tank, a gas air-compressor, and a clean water screw pump;
   the gas storage tank is connected to the gas air-compressor and is connected to the simulated stratum through a gas pressure regulating valve;
   the clean water screw pump is connected to the simulated stratum through the clean water storage tank;
   the simulated stratum is connected to the separation tank;
   the simulated fracture system comprises two sets of upper and lower simulated fractures, each set of simulated fractures being a space formed by two parallel transparent resin plates;
   two sides of each of the simulated fractures are connected to the simulated mineshaft and the simulated stratum respectively;
   a high-definition camera is provided in front of each of the simulated fractures;
   the data acquisition system comprises a gas flow meter, at least one liquid flow meter, a pressure sensor, a high-definition camera, and a computer.

2. The mineshaft-stratum fracture coupled flowing simulation experiment device according to claim 1, wherein the gas flow meter is provided between the gas storage tank and the simulated stratum; a first liquid flow meter is provided between the drilling fluid storage tank and the simulated drilling rod, a second liquid flow meter is provided as well between the clean water storage tank and the simulated stratum; a wellhead and a bottom of the simulated mineshaft, an upper end and a lower end of the simulated stratum and the simulated fractures are connected to the pressure sensor; the high-definition camera is provided in front of each of the simulated fractures; the gas flow meter, the first liquid flow meter, the second liquid flow meter, the pressure sensor, and the high definition camera are all connected to the computer.

3. The mineshaft-stratum fracture coupled flowing simulation experiment device according to claim 1, wherein a first liquid pressure regulating valve and a one-way valve are provided between the drilling fluid screw pump and an inlet end of the simulated drilling rod, a second liquid pressure regulating valve is provided between the clean water screw pump and the simulated stratum and configured to control the one-way flowing of fluid.

4. The mineshaft-stratum fracture coupled flowing simulation experiment device according to claim 1, wherein a first constant pressure overflow valve is provided between the simulated mineshaft and the drilling fluid storage tank, a second constant pressure overflow valve is provided between the simulated stratum and the separation tank; wherein the first constant pressure overflow valve and the second constant pressure overflow valve are configured to control the pressure inside the simulated mineshaft and the simulated stratum to be constant.

5. A method for performing a simulation experiment on coupled flowing in a mineshaft and stratum fractures by using the device according to claim 1, sequentially comprising the following steps:
   (1) pumping drilling fluid in the drilling fluid storage tank into the simulated drilling rod by means of the drilling fluid screw pump through the liquid pressure regulating valve and the one-way valve, annularly returning the drilling fluid through the simulated mineshaft to the drilling fluid storage tank through the constant-pressure overflowing valve, regulating the pressure of the fluid in the simulated mineshaft through the liquid pressure regulating valve and the constant-pressure overflowing valve, and simulating an actual mineshaft environment;
   (2) conveying water in the clean water storage tank to flow to the simulated stratum by means of the clean water screw pump through the liquid pressure regulating valve and the one-way valve, pressing gas in the gas storage tank by means of the gas air-compressor through the gas pressure regulating valve and the one-way valve, carrying out gas-liquid mixing and then conveying the mixture into the simulated fracture;
   (3) conveying fluid overflowing from the simulated stratum to the separation tank through the constant-pressure overflowing valve for separation, and then returning to the clean water storage tank; regulating the gas-liquid content of the simulated stratum and the pressure of the simulated stratum through the liquid pressure regulating valve, the gas pressure regulating valve and the constant-pressure overflowing valve, and simulating a stratum environment; and
   (4) switching on a simulated fracture switch and simulating mineshaft-fracture coupled flowing.

* * * * *